US007076313B2

(12) United States Patent
Welch

(10) Patent No.: US 7,076,313 B2
(45) Date of Patent: Jul. 11, 2006

(54) METHOD FOR OPTIMIZING CONFIGURATION OF PICK-AND-PLACE MACHINE

(75) Inventor: Kurt D. Welch, Ray, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 474 days.

(21) Appl. No.: 10/456,263

(22) Filed: Jun. 6, 2003

(65) Prior Publication Data

US 2004/0249492 A1 Dec. 9, 2004

(51) Int. Cl.
*G06F 15/18* (2006.01)

(52) U.S. Cl. .................. 700/28; 700/48; 700/103; 700/121; 706/13

(58) Field of Classification Search .................. 700/28, 700/48, 97, 103, 121; 706/13, 14, 25, 62
See application file for complete search history.

(56) References Cited

U.S. PATENT DOCUMENTS

| 5,390,283 | A | | 2/1995 | Eshelman et al. | |
|---|---|---|---|---|---|
| 5,764,857 | A | * | 6/1998 | Suzuki | 706/13 |
| 5,864,833 | A | * | 1/1999 | Schaffer et al. | 706/13 |
| 5,970,487 | A | * | 10/1999 | Shackleford et al. | 707/6 |
| 6,260,178 | B1 | * | 7/2001 | Schaffer | 716/2 |
| 6,487,544 | B1 | * | 11/2002 | Eshelman et al. | 706/13 |
| 6,594,531 | B1 | * | 7/2003 | Eshelman et al. | 700/28 |
| 6,886,003 | B1 | * | 4/2005 | Kishi | 706/13 |

FOREIGN PATENT DOCUMENTS

| EP | 0694251 A3 | 4/1994 |
|---|---|---|
| WO | WO 2003/105080 A3 | 12/2003 |

* cited by examiner

*Primary Examiner*—Albert W. Paladini
*Assistant Examiner*—Douglas S. Lee
(74) *Attorney, Agent, or Firm*—Brinks Hofer Gilson & Lione

(57) ABSTRACT

A method for optimizing the configuration of a pick-and-place machine utilizes a genetic algorithm that creates an initial population of possible configurations and selects an optimum configuration based upon lowest cycle time. The method then creates a next generation by selecting possible configurations from the prior generation and randomly mutating instructions. The method compares the mutated configuration having the lowest cycle time from the next generation and the configuration having the lowest cycle time from the prior generation, and selects the optimum configuration. The steps are repeated to evaluate additional generations of mutated configurations. After several mutated generations have been evaluated, the method creates a new initial population and evaluates the new initial population and mutated generations derived therefrom, compares the optimum configuration from the new initial populations with the optimum configuration from the prior initial population, and selects the optimum configuration. In this manner, the method may evaluate several initial populations and mutated generations therefrom in selecting the optimum configuration for use in operating the machine.

10 Claims, 1 Drawing Sheet

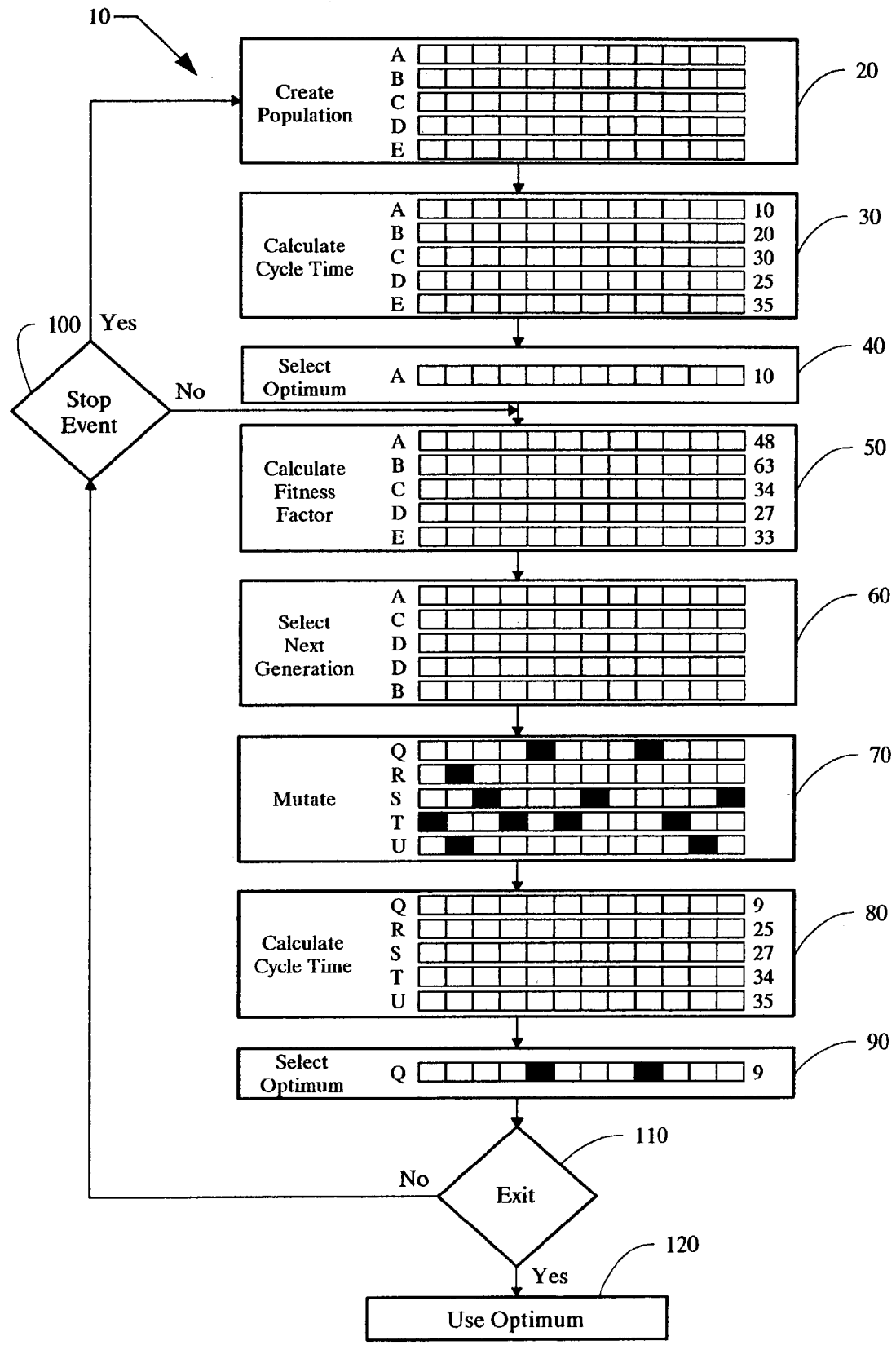

METHOD FOR OPTIMIZING CONFIGURATION OF PICK-AND-PLACE MACHINE

TECHNICAL FIELD OF THE INVENTION

This invention relates to a method for optimizing a configuration of a pick-and-place machine using a genetic algorithm. More particularly, this invention relates to an algorithm for such method that creates an initial population of possible configurations, determines a lowest cycle time configuration, creates a next generation based upon possible configurations of the prior generation that include random mutations, compares the lowest cycle time configuration from the next generation and compares it to the lowest cycle time configuration from the prior generation, and repeats the steps until an optimum configuration is selected for the pick-and-place machine.

BACKGROUND OF THE INVENTION

In the manufacture of a microelectronic assembly, electronic components are arranged on a printed circuit board by a pick-and-place machine. The pick-and-place machine comprises a plurality of placement devices, such as suction nozzles sized and shaped to pick up a particular type of component. For example, a pick-and-place machine may include sixteen placement devices. During operation, each placement device moves to a component feeder, picks up a electronic component, moves over the printed circuit board, and positions the component at a designated location on the board, before proceeding to pick up a next component, until all components are placed. The pick-and-place machine is controlled by a computer program, referred to as a configuration. The configuration includes a series of instructions for each placement device that specifies the particular electronic components, the feeder locations, the order of placement, and the positions on the board. It is desired to minimize the cycle time for placing all components to maximize the productivity of the machine. However, determining the configuration having the minimum cycle time is a complicated matter because of the multiplicity of placement devices, components, and board locations. This is made even more complicated in machines that index the board during placement operations so that particular devices only have access to specific regions of the board at certain times.

In order to determine the optimum configuration, it has been proposed to use a genetic algorithm. The algorithm creates a population of possible configurations and determines the optimum. The algorithm then creates a next generation by selecting configurations from the prior generation and modifying the instructions. Current genetic algorithms for pick-and-place configurations adopt a selection process referred to as survival of the fittest, wherein the algorithm creates the next generation based on only the configurations from the prior generation that have the lower cycle times, while excluding configurations with longer cycle times from further consideration. Also, modifications are made by cross-breeding, a process in which instructions from one possible configuration is transposed into another possible configuration within the population. Thus, the algorithm seeks to converge on a solution by selecting better solutions and cross-breeding instructions among the better solutions. This tends to produce a more uniform population with small variations. In so doing, it does not consider possible configurations that differ substantially and may lead to even better solutions.

Therefore, a need exists for an algorithm for developing an optimum configuration for a pick-and-place machine that increases diversity among the possible configurations that are evaluated by providing a more random selection of possible configurations from one generation to the next and by providing more random mutations within the next generation.

SUMMARY OF THE INVENTION

In accordance with this invention, a method is provided for optimizing a configuration of a pick-and-place machine. Initially, the method creates an initial population of possible configurations as the first generation. As used herein, possible configurations refers to configurations that are capable of being executed by the pick-and-place machine, so that the configurations are preferably checked to exclude configurations that are inconsistent with the operation of the machine. The method then estimates the cycle time for each possible configuration and selects the lowest cycle time.

The method then creates a next generation by randomly selecting possible configurations from the prior generation and introducing random mutations into the possible configurations of the next generation. In a preferred embodiment, the possible configurations are randomly selected from the prior population based upon a fitness probability. The preferred fitness probability is based upon the standard deviation of cycle times for the placement devices. In this manner, possible configurations that provide for a more uniform operation of the placement devices have an increased probability of being selected for the next generation, whereas possible configurations that have a large disparity in the placement instructions of the placement devices have a relatively lower probability of selection. Nevertheless, it is a feature of the preferred method that the next generation is selected from all possible configurations of the prior generation. It is also a feature that mutations are randomly made to the next generation. Thus, a possible configuration having an unfavorable estimated cycle time may be selected from the prior generation and, through random mutation, modified in a manner that produces the optimum configuration. At the same time, possible configurations having low estimated cycle times are also selected and mutated in search of a further reduced cycle time.

After creating the next generation and introducing random mutations, the method estimates the cycle times for the members thereof. The method selects the possible configuration with the lowest cycle time, compares the cycle time with the lowest cycle time configuration from the prior generation, and selects the configuration with the lowest cycle time as the optimum configuration. The method then repeats the steps of selecting possible configurations from the prior generation to create a next generation, introducing random mutations into the next generation, and evaluating the mutated configurations, selecting the lowest cycle time, and comparing to the lowest cycle time configurations of the prior generation to find the optimum.

The method continues the steps of creating, mutating and evaluating subsequent generations until a stop event occurs, which may be based upon a predetermined time, predetermined number of iterations, or a lack of significant improvement in the series of prospective configurations.

In the preferred embodiment, the method then creates a new initial population and repeats the steps of selecting, mutating and evaluating generations based upon the new initial population. The prospective configuration from the first population is compared to the prospective configuration from the second population to select the optimum configuration for the machine. Similarly, the method may create additional initial populations and evaluate them.

Therefore, a method of this invention provides a genetic algorithm for determining an optimum configuration of a pick-and-place machine that increases diversity among the possible configurations that are evaluated. By choosing among all possible configurations from the prior generation, the method permits a poor configuration to be selected and, through mutation, developed into an optimum configuration. At the same time, the method allows configurations with low cycle times to be selected and mutated. Thus, this invention maximizes the number of disparate possibilities that are evaluated, and increases the probability that the best configuration will be developed within allotted computer resources.

BRIEF DESCRIPTION OF THE DRAWINGS

This invention will be further described with reference to the accompanying FIGURES wherein:

FIG. 1 is a flow diagram showing a method for optimizing a configuration of a pick-and-place machine in accordance with this invention.

DETAILED DESCRIPTION OF THE INVENTION

In accordance with a preferred embodiment of this invention, a method is provided for optimizing the configuration of a pick-and-place machine. By way of a preferred example, pick-and-place machines are available from Assembleon Americas, Alpharetta, GA, under the designation Fast Component Mounter. The machine comprises a conveyor that indexes printed circuit boards through a series of stations where electronic components are mounted onto the boards. The electronic components are supplied from feeders arranged adjacent to the conveyor. The machine comprises placement heads that travel between the feeders and locations on the printed circuit board. During operation, each head picks up a designated electronic component from a designated feeder and places the component at a designated location on the board, then picks up and places the next component. Operation of the machine is controlled by a computer in accordance with the machine configuration. As used herein, configuration refers to a set of instructions that direct each placement device to pick up one of a plurality of electronic components at one of a plurality of feeders and place the component at a designated location on the printed circuit board. The configuration also includes instructions for arranging the feeders so that a particular placement device has access to the component to be picked up.

In general, the method of this invention seeks to optimize the configuration of the pick-and-place machine by providing a configuration that has the lowest cycle time. The cycle time represents the time required for all components to be placed on printed circuit board. In general, reducing the cycle time increases the productivity of the machine by increasing the number of printed circuit boards that may be populated with electronic components within a predetermined time. Determination of an optimum configuration is complicated because of the multiplicity of possible arrangements of feeders, the multiplicity of placement devices, the multiplicity of electronic components and the multiplicity of locations on the printed circuit board, as well as the limited time during which a placement head may have access to a particular region of the printed circuit board for placing components there.

The method of this invention uses a genetic algorithm to determine an optimum configuration for the pick-and-place machine. In general, the genetic algorithm creates and evaluates a population of possible configurations to determine a lowest cycle time configuration, then creates and evaluates a series of generations based on the initial population with random mutations. In each generation, the method selects possible configuration from the prior generation by a selection process that selects from all members of the prior generation. The method introduces mutations randomly into the next generation, evaluates the next generation with the mutations, compares the lowest cycle time configuration of the next generation with the previous lowest configuration to select the optimum configuration. After evaluating several generations, the method is repeated, starting with a new initial population. After several initial populations have been evaluated, the optimum configuration is downloaded for use in operating the pick-and-place machine.

Referring now to the FIGURE, there is depicted a flow diagram 10 for carrying out the method of this invention. At step 20, the method creates an initial population of possible configurations as the first generation. This is accomplished by randomly generating instruction sets and checking to determine that the instruction set satisfies certain rules regarding operation of the machine. For a set of instructions, the method may check that the placement device has access to the feeder for the designated component, that the placement device is equipped with a suction nozzle suited for picking up the designated component, that the placement head has access to the designated location on the printed circuit board at the time that the instruction is to be carried out, that a component has not already been placed at the designated location, and so on. Thus, the initial population represents instruction sets that are valid operations of the machine. While the FIG. 1 shows a small number of configurations for purposes of illustration, a population of about 100 is preferred to permit meaningful evaluation.

At step 30, the method estimates the cycle times for the possible configurations in the initial population, using a suitable program for estimating cycle times of pick-and-place machines. At step 40, the method selects the possible configuration having the lowest estimated cycle time and stores this as an optimum configuration.

The method then creates a next generation of possible configurations that is composed of possible configurations selected from the prior generation by a process that selects from all possible configurations of the prior generation based upon a fitness probability. For this purpose, at step 50, the method determines a fitness factor for each possible configuration of the prior generation. A suitable fitness factor is based upon the standard deviation of the individual cycle times of the placement devices. Thus, for each configuration, the cycle times of each placement device is estimated, and the standard deviation is calculated. Thus, a configuration in which all placement devices carried out assigned placements in approximately equal time would result in a low fitness factor. In contrast, a configuration in which there is wide variation in the times required for different placement devices to place the components would result in a high fitness factor.

At step 60, the method creates the next generation using the fitness factor. Preferably, the optimum configuration is included as one member of the next generation. The remainder of the next generation is randomly selected from all configurations of the prior generation using the fitness factor to increase the probability that low cycle time configurations are selected. A preferred fitness probability is in accordance with the following steps:

1. Determine the highest fitness factor for the prior generation.

2. For each possible configuration in the prior generation, subtract the fitness factor from the highest fitness factor and add 1 to determine a fitness value. One is added so that all members have a probability of selection; otherwise the configuration with the highest fitness factor would have a 0 probability of selection.

3. Square the fitness value determined in step 2.

4. Sum the squares of the fitness values for all possible configurations.

5. Generate a random number between zero and the sum of the squared fitness values in step 4.

6. Proceeding in order through the prior generation, determine whether the squared fitness value is greater than the random number. If the squared fitness value is greater than the random number, select the possible configuration for inclusion in the next generation. If the squared fitness value is not greater than the random number, subtract the squared fitness value from the random number, producing a revised number.

7. Using the revised number, compare the squared fitness value of the next possible configuration. If the squared fitness value of the next possible configuration is greater than the revised number, select the possible configuration for inclusion in the next generation. If the squared fitness value is not greater than the revised number, subtract the squared fitness value from the revised number, and use this revised number in considering the next possible configuration.

It will be appreciated that the foregoing method provides a preferred example for selecting possible configurations based upon a fitness probability, but that other methods are available for selecting the possible configurations for the next generation.

After the next generation has been selected, the method introduces random mutations into the possible configurations at step 70. The following represent examples of preferred types of mutations that may be incorporated into the possible configurations of the next generation:

1. In an instruction that designates a particular placement device to pick up and place a designated component, the instruction may be mutated by designating a different placement device for the component.

2. For an instruction that designates placement of a particular component during a particular time, the instruction may be modified by designating a different time. For example, a printed circuit board may travel through the pick-and-place machine in a series of discreet steps, referred to as an index as opposed to a continuous motion. During each index, each placement device has access to a limited region of the printed circuit board. Thus, in this example, the instruction is mutated to designate placement of the particular component during a different index, that is, during a different time within the cycle.

3. Each configuration includes an instruction for a feeder setup, that is, an arrangement of feeders for supplying the placement devices. The configuration may be mutated by altering the feeder setup.

Mutations may be made to a predetermined number of instructions within the next generation. For example, mutations may be made to 4% of the instructions. Following each mutation, the mutated configuration is checked according to the rule set for operating the pick-and-place machine to assure that the mutated configuration represents a valid operation of the machine.

Following mutation of the next generation, step 80 estimates the cycle time for each possible configuration of the next generation. The method then identifies the possible configuration of the next generation having the lowest cycle time. At step 90 the method compares the cycle time of the lowest cycle time configuration with the optimum configuration determined following evaluation of the prior generation. If the lowest cycle time of the next generation is lower than that of the optimum configuration, the method selects the associated possible configuration as the optimum configuration.

The next generation then becomes the prior generation, and the method repeats the process of creating a next generation by determining fitness factor, selecting possible configurations in accordance with a fitness probability and randomly mutating instructions. The method then evaluates the next generation, compares the best result with the optimum configuration from the prior generations, and selects the optimum configuration.

The method continues repeating the steps of evaluating next generations of mutated possible configurations until triggered by a stop event 100. The stop event 100 may be a predetermined time or a predetermined number of generations. Alternately, the method may be stopped after the fitness factors for the next generation fall below a threshold value indicating that the members of the generation have converged upon a solution and no longer represents a diverse population.

Thus, starting within an initial population, the method determines an optimum configuration after several generations of mutations. In the preferred embodiment, following the stop event 100, the method is repeated, creating a new initial population of possible configurations and generations of mutated configurations derived from the new initial population. The method then determines an optimum configuration for the new initial population and compares this optimum configuration to the optimum configuration derived for prior populations. Thus, the method may determine optimum configurations from a number of initial populations and their mutated progeny to find the optimum configuration for operating the pick-and-place machine.

At step 110, at some point, typically determined by the availability of computer resources, the method is interrupted. The optimum configuration is then downloaded and used for configuring the pick-and-place machine.

Therefore, this invention provides a method for optimizing the configuration of the pick-and-place machine using genetic algorithms. The method creates an initial population of possible configurations and then evaluates those possible configurations and their mutated progeny to determine an optimum configuration for the pick-and-place machine. One advantage of the method is that it may select from all possible configurations of a prior generation in creating the next generation. That is, the method does not exclude possible configurations based upon high cycle times or other predetermined parameters. Thus, even a configuration having a high cycle time or a poor fitness factor is available for reproduction and mutation to produce an optimum configuration. Thus, the method of this invention promotes diversity within the generations derived from an initial population. Moreover, the method of this invention introduces random mutations into the possible configurations of the next generation. This further promotes diversity within the mutated generations, particularly in comparison to methods that utilize cross-breeding or other techniques that limit changes in the population to instructional sets within the population. As a result, the method is able to evaluate a wider range of instructional sets over the course of a limited number of generations. This increases the likelihood that the optimum configuration determined by the method represents the best possible configuration for the machine.

While this invention has been described in terms of certain embodiments thereof, it is not intended to be limited to those embodiments, but rather only to the extent set forth in the claims that follow.

The invention claimed is:

1. A method of optimizing a configuration of a pick-and-place machine comprising a plurality of placement devices, said configuration comprising a series of instructions that direct each placement device to pick up one of a plurality of electronic components at one of a plurality of feeders and place the component at a designated location on a substrate, said method comprising:
   (a) creating an initial population of possible configurations to be a first generation,
   (b) estimating cycle time for each possible configuration and selecting the possible configuration having a lowest estimated cycle time as an optimum configuration;
   (c) creating a next generation of possible configurations by selecting the optimum configuration and certain possible configurations from the prior generation;
   (d) randomly mutating at least one instruction of all the possible configurations of the next generation;
   (e) estimating cycle time for each possible configuration of the next population,
   (f.1) comparing the cycle time of the possible configuration of the next generation after mutation having the lowest cycle time with the cycle time of the optimum configuration, and of these two configurations selecting the configuration having the lower cycle time as an updated optimum configuration;
   (f.2) setting the next generation after mutation as the prior generation;
   (g) repeating steps (c) through (f.2) at least one time; and
   (h) selecting the updated optimum configuration for use in operating the pick-and-place machine.

2. A method in accordance with claim 1 wherein the step of creating a next generation comprises selecting certain possible configurations from the prior generation based upon a fitness probability.

3. A method in accordance with claim 2 wherein the fitness probability is based upon a fitness factor determined by a standard deviation in individual cycle times of the placement devices.

4. A method in accordance with claim 1 wherein the step of mutating at least one instruction of the possible configuration comprises randomly selecting an instruction that directs a particular placement device to pick up a particular component, and directing a different placement device to pick up the particular component.

5. A method in accordance with claim 1 wherein the step of mutating at least one instruction of the possible configuration comprises randomly selecting an instruction that directs a particular placement device to pick up a particular component at a particular time, and directing the particular placement device to pick up the particular component at a different time.

6. A method in accordance with claim 1 wherein the possible configuration comprises a feeder set up, and wherein the step of mutating the possible configuration comprises changing the feeder set up.

7. A method in accordance with claim 1 wherein the step of creating the next generation includes selecting a new optimum configuration.

8. A method in accordance with claim 1 further comprising, following a predetermined stop event, creating a new initial population; repeating steps (b) through (h); and selecting a final optimum configuration in step (i) from the optimum configurations derived from the prior initial population and the new initial population.

9. A method in accordance with claim 2 wherein the fitness probability is determined by, for each possible configuration, calculating individual cycle times for the possible devices, determining a fitness actor based upon a standard deviation for the cycle times, squaring the difference between the fitness factor of each possible configuration and the highest fitness factor for the prior generation; and randomly selecting possible configurations for the next generation based upon the squared difference.

10. A method in accordance with claim 1 wherein the step of mutating at least one instruction of the possible configuration comprises at least one of
   (a) randomly selecting an instruction that directs a particular placement device to pick up a particular component, and selecting a different placement device to pick up the particular component;
   (b) randomly selecting an instruction that directs a particular placement device to pick up a particular component at a particular time, and selecting a different time, or
   (c) randomly changing the feeder set up.

* * * * *

UNITED STATES PATENT AND TRADEMARK OFFICE
CERTIFICATE OF CORRECTION

PATENT NO. : 7,076,313 B2  Page 1 of 1
APPLICATION NO. : 10/456263
DATED : July 11, 2006
INVENTOR(S) : Kurt D. Welch It is certified that error appears in the above-identified patent and that said Letters Patent is hereby corrected as shown below:

<u>On The Title Page</u>, Item (56)

In column 2, line 1, under "FOREIGN PATENT DOCUMENTS", delete "0694251" and substitute --0594251-- in its place.

Signed and Sealed this

Twelfth Day of December, 2006

JON W. DUDAS
*Director of the United States Patent and Trademark Office*